Sept. 6, 1955 H. W. BAUMAN 2,717,281

MOTOR DRIVE

Filed March 8, 1951 2 Sheets-Sheet 1

Harold W. Bauman
INVENTOR.

BY [signature]
[signature]
ATTORNEYS

Sept. 6, 1955 H. W. BAUMAN 2,717,281

MOTOR DRIVE

Filed March 8, 1951 2 Sheets-Sheet 2

Harold W. Bauman
*INVENTOR.*

BY [signatures]

ATTORNEYS

United States Patent Office 2,717,281

Patented Sept. 6, 1955

2,717,281

MOTOR DRIVE

Harold W. Bauman, Chicago, Ill., assignor to Ampro Corporation, Chicago, Ill., a corporation of Illinois Application March 8, 1951, Serial No. 214,601

4 Claims. (Cl. 179—100.2)

The present invention relates to motor drive mechanism for reproducing instruments of the kind arranged for translating a record of a signal on a traveling record body into an electrical output and that includes magnetic circuit means that are subject to energization by stray magnetic fields. Instruments of this kind are typified by magnetic pickup devices for reproducing sound from magnetized elongate record bodies and instruments for reproducing sound from disc recordings by pickups of the so-called "variable reluctance" type, as well as those having moving coils. When the pickup heads of such instruments are subjected to stray magnetic fields they produce an error component of their electrical outputs.

A two-pole shaded pole induction motor has excellent qualities of constant speed and power suiting such motor to record body driving. However, such motors of more conventional form are notorious producers of stray magnetic fields. Heretofore, reproducing instruments of the kind in question either have been provided with four-pole shaded pole induction motors which do not produce strong stray magnetic fields but are much more expensive than the two-pole motors, or such instruments have been powered by two-pole motors and provided with elaborate shielding means for protecting the magnetic circuit means from stray fields and usually such instruments require very careful orientation of the motor relative to the pickup head in addition to shielding to avoid energization of the pickup by the stray fields.

The present invention relates to a highly specialized motor drive for instruments of the type described above which permits use of an inexpensive two-pole shaded pole induction motor but which does not require any shielding to protect the pickup head from the effect of stray magnetic fields produced by the motor and which does not require any exactness of orientation of the motor relative to the head.

The invention is based on the perception that the stray magnetic fields produced by two-pole shaded pole induction motors of more conventional type arise from magnetic saturation of the pole piece sections that are surrounded by shading coils. This saturation arises from the heavy currents flowing in the shading coils. The magnetic saturation of these pole piece portions produces spraying of an intense magnetic field in all directions. Portions of the fields of the pole piece portions escape through the gap in the C-shaped iron structure of the motor. Additionally, the invention is based on the perception that a different type of two-pole shaded pole motor, which type is also a conventional (though less common) type of motor than the one with the C-core, has a self-shielding characteristic that admirably suits it to use with instruments provided with magnetic circuit means that are subject to energization by the stray magnetic fields produced by the more common type of motor.

The self-shielding two-pole shaded pole induction motor comprises a continuous iron structure that completely surrounds central pole pieces and that serves as an effective shield against escape of magnetic fields from the portions of the pole pieces that are encircled by the shading coils.

Figure 1:
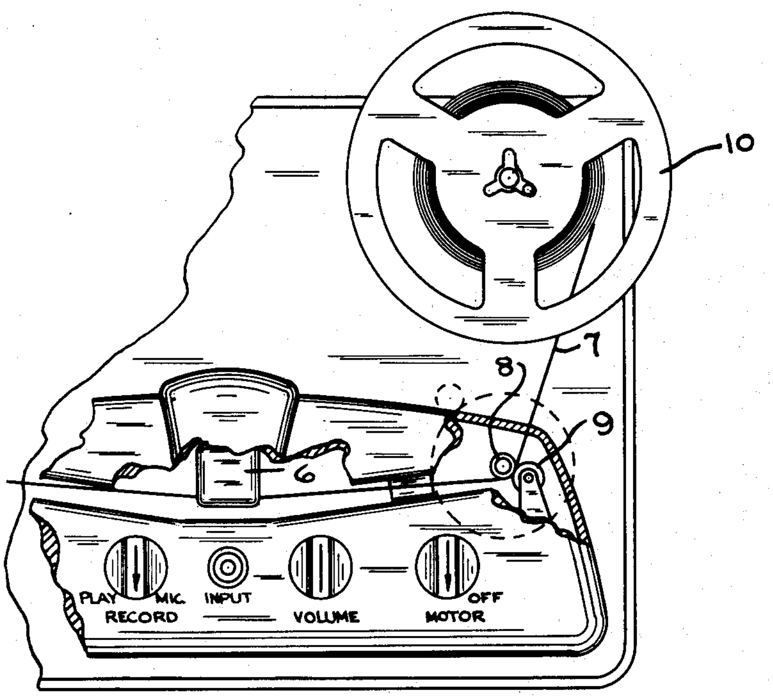
Fig. 1 is a fragmentary top plan of a sound reproducing instrument arranged to reproduce from a magnetized tape form record.

Describing the drawings in detail, and first referring to Fig. 1, the reproducing instrument comprises a magnetic pickup head 6 past which a record body of tape form, as 7, is drawn by a rotatable capstan 8 with which is cooperative a pinch roller 9. After passing capstan 8 the record body is wound onto a take-up reel 10 that is driven by a suitable spindle.

Figures 2, 3:
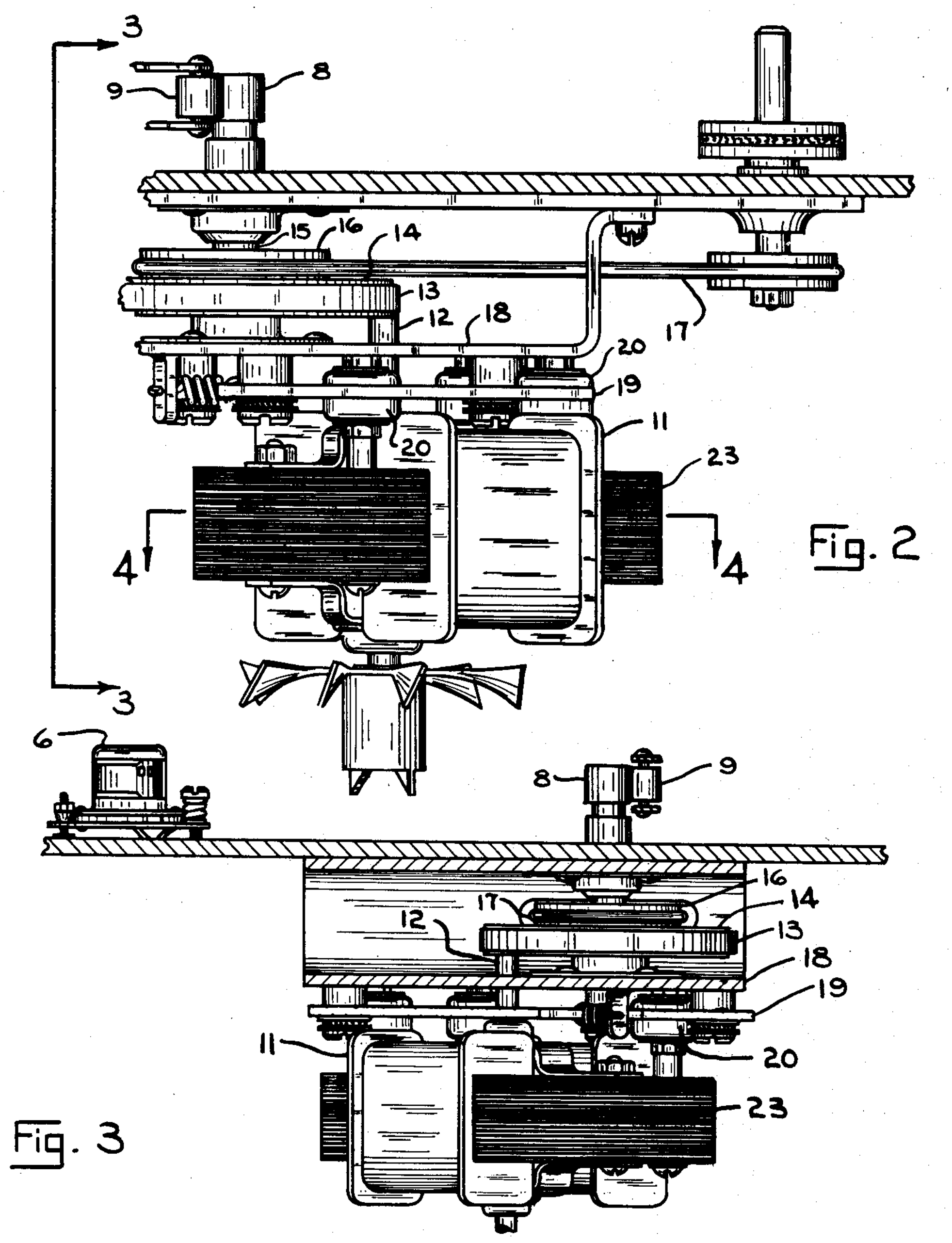
Fig. 2 is a fragmentary sectional view showing in end elevation a driving assembly for a record body in an instrument of the kind shown in Fig. 1 and including the arrangement of the present invention.
Fig. 3 is a side elevation of the assembly as shown by line 3—3 of Fig. 2.

For driving capstan roller 8 a motor 11 of the self-shielding two-pole shaded pole induction type, above referred to, is employed. As shown in Figs. 2 and 3, this motor has an output spindle 12 that contacts the rubber tire periphery 13 of a flywheel 14. Capstan 8 is axially aligned with and attached to flywheel 14 by a spindle structure 15. A pulley 16 is also secured to flywheel 14 and drives the take-up spindle through a belt 17. The motor 11 is suspended from a plate 18 through a motor supporting plate 19 that is pivotally secured to plate 18 and from which motor 11 is suspended by resilient grommets 20.

Figure 4:
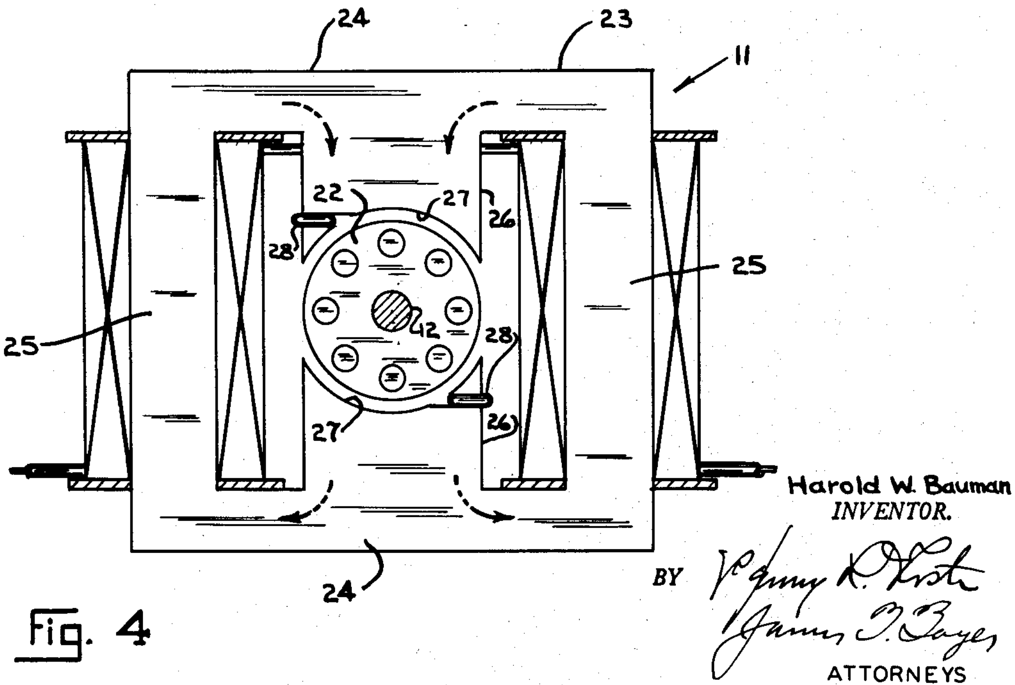
Fig. 4 is a sectional view on line 4—4 of Fig. 2 showing the internal structure of the motor.

Referring to Fig. 4, motor 11 comprises a rotor 22 of conventional squirrel-cage construction. Spindle 12 projects axially from rotor 22. Surrounding the periphery of rotor 22 is a laminated highly magnetically permeable iron core structure 23. This core structure has opposite pairs of side reaches 24 and 25. From central portions of side reaches 24 pole pieces 26 project inward toward rotor 22 and they are provided with curved polar surfaces 27 that are closely spaced from the periphery of the rotor 22. Portions of the pole pieces 26 are surrounded by shading coils 28.

On the remaining pair of side reaches 25 of the stator structure are mounted a pair of windings 26 that are so wound and connected in series as to produce magnetic flux of similar polarity at their corresponding ends. The path of such flux is indicated by the arrows in Fig. 4, being of similar polarities at the portions of the side reaches 24 from which pole pieces 26 extend. The magnetic flux produced by the respective windings is forced to flow through the pole pieces, thereby creating the necessary magnetic field energy to rotate rotor 22.

It will be noted that the laminated stator core structure reaches 24, 25, form a continuous magnetic circuit that completely encircles the gap between the polar surfaces 27, and, particularly, the portions of the polar surfaces at the ends of the pole piece parts encircled by the shading coils 28. The continuous path provided by the stator structure serves as an effective shield to prevent spread of magnetic fields extending from the ends of the pole piece parts surrounded by the shading coils.

There is a certain amout of spreading of these intense magnetic fields in directions generally parallel to the axis of rotor 22 and spindle 12. It has been discovered, however, that a displacement of the motor axis of several inches from the pickup head is adequate to prevent energization of the head by these spreading portions of stray magnetic fields.

I claim:

1. In an instrument that includes a pickup device for developing from a recording on a moving record body a corresponding signal output, and that includes magnetic means energizable by stray magnetic fields to produce an error signal output component, and said instrument including a drive member that is rotatable to move a record body relative to said pickup device; a two-pole shaded pole induction motor of the type including a rotor and a highly magnetically permeable stator structure including a pair of pole-forming parts having at their respective ends polar surfaces that are respectively disposed to opposite sides of the periphery of said rotor and radially spaced from its axis, and shading coils mounted on said parts adjacent their polar surfaces, and a core portion of said stator structure forming a continuous magnetic circuit structure extended completely about the periphery of said rotor and about said pole-forming parts and their polar surfaces, said motor being displaced from said magnetic means radially with respect to the axis of rotation of its rotor, and means mechanically connecting said rotor to said rotatable member for driving the latter.

2. In an instrument for translating a signal magnetically recorded on an elongate variably magnetized record body and including a pickup head having a magnetic circuit element provided with a gap for energization by magnetic fields of said record body, and a capstan spaced from said head and rotatable to advance the record body past said gap; a two-pole shaded pole motor of the type including a rotor and a highly magnetically permeable stator structure including a pair of pole-forming parts having at their respective ends polar surfaces that are respectively disposed to opposite sides of the periphery of said rotor and radially spaced from its axis, and shading coils mounted on said parts adjacent their polar surfaces, and a core portion of said stator structure forming a continuous magnetic circuit structure extended completely about the periphery of said rotor and about said pole-forming parts and their polar surfaces, said motor being displaced from said magnetic means radially with respect to the axis of rotation of its rotor, and means mechanically connecting said rotor to said rotatable member for driving the latter.

3. In an instrument that includes a pickup device for developing from a recording on a moving body a corresponding signal output and that includes magnetic means energizable by stray magnetic fields to produce an error signal output component, and said instrument including a drive member that is rotatable to move a record body relative to said pickup device; a two-pole shaded pole induction motor of the type including a rotor and a highly magnetically permeable stator structure including a pair of pole-forming parts having at their respective ends polar surfaces that are respectively disposed to opposite sides of the periphery of said rotor and shading coils mounted on said parts adjacent their polar surfaces, and a core portion of said stator structure forming a continuous magnetic circuit structure extended completely about the periphery of said rotor and about said pole-forming parts and their polar surfaces, and means mechanically connecting said rotor to said rotatable member for driving the latter.

4. In a magnetic transducing instrument that includes a transducing head and a capstan displaced laterally and in the direction of a radius of its axis of rotation from said head for drawing past it an elongate record body; a two-pole shaded pole induction motor of the type including a rotor and a highly magnetically permeable stator structure including a pair of pole-forming parts having at their respective ends polar surfaces that are respectively disposed to opposite sides of the periphery of said rotor and radially spaced from its axis, and shading coils mounted on said parts adjacent their polar surfaces, and a core portion of said stator structure forming a continuous magnetic circuit structure extended completely about the periphery of said rotor and about said pole-forming parts and their polar surfaces, means mounting said motor with its axis disposed parallel to said axis of capstan rotation and spaced from said head in the direction of a radius of said rotor axis, and means coupling said rotor to said capstan for driving the latter.

References Cited in the file of this patent

UNITED STATES PATENTS

| | | |
|---|---|---|
| 1,943,270 | Gough | Jan. 9, 1934 |
| 2,108,569 | Togami | Feb. 15, 1938 |

OTHER REFERENCES

Magnetic Recording, S. J. Begun, 1949, page 107.